United States Patent [19]

Williams

[11] Patent Number: 4,611,242

[45] Date of Patent: Sep. 9, 1986

[54] TWO MODE SCRAMBLING SYSTEM USING IDENTIFIER PULSE IN VERTICAL BLANKING INTERVAL

[75] Inventor: Gregory A. Williams, Elk Grove Village, Ill.

[73] Assignee: Zenith Electronics Corporation, Glenview, Ill.

[21] Appl. No.: 607,988

[22] Filed: May 7, 1984

[51] Int. Cl.$^4$ .................. H04N 7/167; H04N 7/10
[52] U.S. Cl. ............................. 358/123; 358/86
[58] Field of Search .............. 358/117, 122, 123, 86; 455/4

[56] References Cited

U.S. PATENT DOCUMENTS

| | | | |
|---|---|---|---|
| 4,322,745 | 3/1982 | Saeki et al. | 358/123 |
| 4,405,942 | 9/1983 | Block et al. | 358/123 X |
| 4,460,922 | 7/1984 | Ensinger et al. | 358/82 |
| 4,536,791 | 8/1985 | Campbell et al. | 358/86 X |
| 4,554,579 | 11/1985 | Citta | 358/86 |

Primary Examiner—Keith E. George

[57] ABSTRACT

A cable television system capable of decoding signals encoded in two different formats, A and B. Format A is identified by digital data on horizontal lines 10–13 in the vertical blanking interval and format B by digital data on horizontal lines 14–17 in the vertical blanking interval. Logic circuitry receives the vertical blanking interval data and supplies one pulse marking the beginning of the vertical blanking interval and an identifier pulse derived from digital data on horizontal lines 13 or 17. A format mode control switch includes a monostable timing circuit producing an output responsive to the vertical blanking interval pulse for a period terminating at approximately horizontal line 14. The timing circuit output is supplied along with the identifier pulse to the inputs of a flipflop for determining which of the decoders A and B is to be energized.

5 Claims, 3 Drawing Figures

TWO MODE SCRAMBLING SYSTEM USING IDENTIFIER PULSE IN VERTICAL BLANKING INTERVAL

BACKGROUND OF THE INVENTION AND PRIOR ART

This invention relates generally to cable television systems and particularly to cable television systems employing coded signals for special services.

Most cable television operators offer different classes or types of service to their subscribers for additional fees. For example, in addition to conventional network television programs, the cable operator may provide one or more channels dedicated to particular subjects or uses such as movies, sports, special events, and the like. Most cable systems either include or have access to a central computer that automatically identifies each subscriber equipment and the class of service for which the subscriber has contracted. They usually include provision for automatic billing and for determining whether the subscriber is current in his payments. The subscriber equipment is periodically interrogated to update information in the subscriber equipment memory to control suitable decoding circuitry for enabling reception of the special programming for which he has subscribed.

In one well known system, the television signal vertical blanking interval is used to carry instruction and control information to the subscriber equipment. Specifically, data is transmitted on groups of successive horizontal lines in the vertical blanking interval. The data transmission is recognized by circuitry in the subscriber equipment, detected and used to identify the subscriber equipment, load its memory, verify information therein, etc. On one of the horizontal lines, a "market code" is sent which, together with an "address code" on another line, uniquely defines the particular subscriber equipment. The market code generally denotes the geographical area in which the subscriber equipment is located. The point of interest for this invention is that the market code is sent in each field of the transmitted signal and it does not change.

It will be appreciated that a cable operator has a sizable investment in subscriber equipment. As improved equipment is designed and built, it is important that it be compatible with existing equipment. This requirement doesn't post significant difficulty except in the area of the type of encoding/decoding system employed. Signal encoding or scrambling is very important because of the growing need to guard against signal "piracy" and the like. Some systems are easier to defeat, that is to design pirate decoding equipment for, than others. It may very well be that a cable operator would like to update his equipment with that operating on a more sophisticated encoding system, for example. An "overnight" replacement of all of the subscriber equipment is, of course, impossible. Even if such a transition could be made, its cost would be prohibitive. A gradual transition may be made, but only at great inconvenience and at substantially added cost by, in essence, having two different systems and duplicating the special programming on different television channels. The system would then operate with two different encoding systems and accommodate both the old equipment and the new equipment. Such an arrangement is also not practical nor desirable. Accordingly, there is a need in the art to provide a system for enabling different types of encoded transmissions to be received by subscribers.

OBJECTS OF THE INVENTION

A principal object of this invention is to provide a novel cable television system.

Another object of this invention is to provide a cable television system capable of operation with different encoding systems.

A further object of this invention is to provide a cable television system having signals encoded in different formats.

SUMMARY OF THE INVENTION

In accordance with the invention, a television system includes means for transmitting signals encoded in different formats, means for including an identifier to identify the particular transmission format, means for receiving the transmission and the identifier and format mode control means responsive to the identifier for selectively decoding the differently formatted signals.

At the signal transmitting end, a television signal transmission means 9, of well known construction, provides suitable television signals to tuner 10. Transmission means 9 includes means for inserting data on selected horizontal lines in the television signal vertical blanking interval. A gate 8 is supplied from a source of market code data 7 for inclusion of a market code on either horizontal line (HL) 13 or 17 of the television signal. A format switch 6 is used to control gate 8 to selectively impose the market code information on HL 13 or HL 17 for identifying the encoding format being used, ie. either format A or format B, as will be explained.

BRIEF DESCRIPTION OF THE DRAWINGS

Other objects and advantages of the invention will be apparent upon reading the following description in conjunction with the drawings in which.

DESCRIPTION OF THE PREFERRED EMBODIMENT

Figure 1:
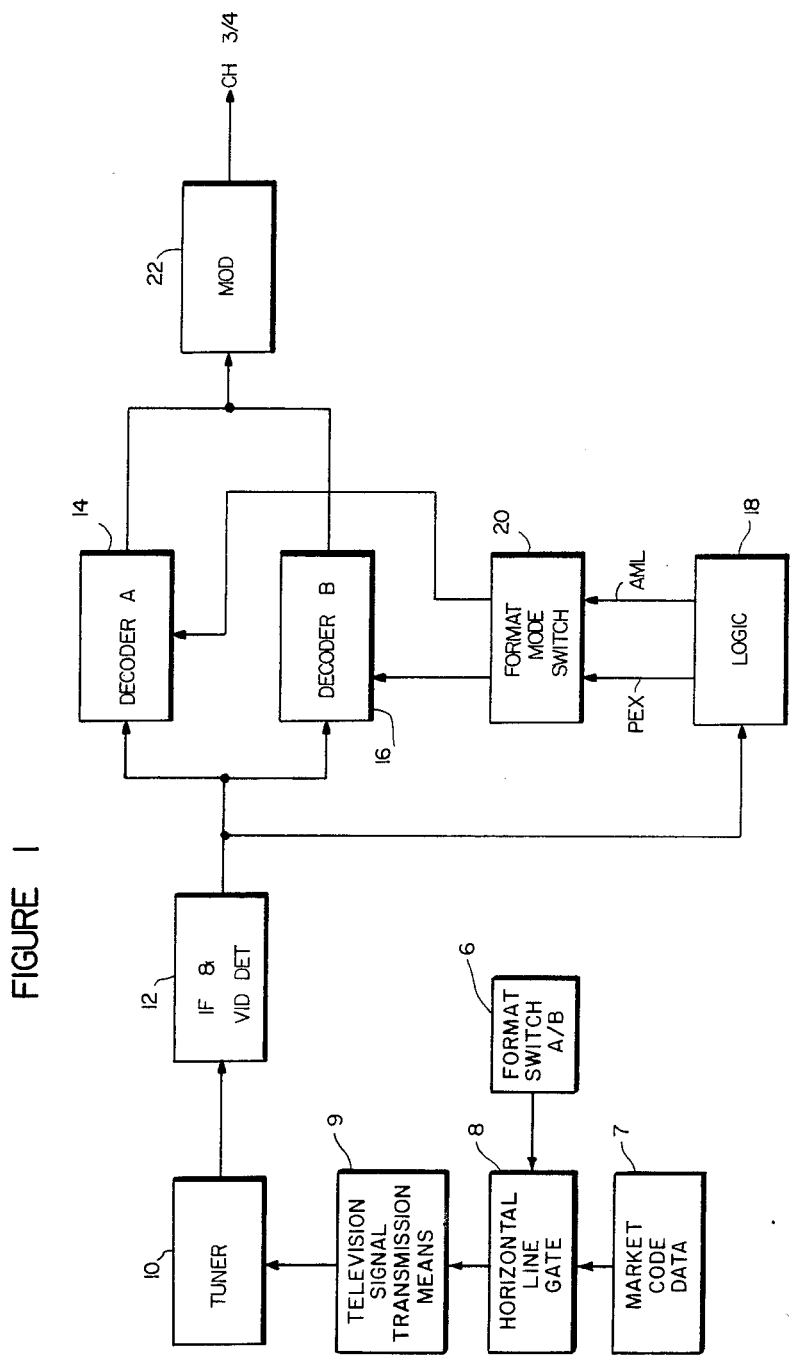
FIG. 1 represents a block diagram of a television system constructed in accordance with the invention.

Referring to FIG. 1, a tuner 10 is coupled to an IF and video detector 12 for processing received television signals to produce a baseband video signal output, as is well known in the art. The output is coupled to a block 14, labelled Decoder A, to a block 16, labelled Decoder B, and to a block 18, labelled Logic. Decoder A will be understood to include suitable means for decoding or unscrambling a signal coded in a first format that is presented at its input and for supplying the unscrambled signal at its output. Decoder B will include similar means for unscrambling signals coded in a second, different format. For example, Decoder A may include apparatus operating in accordance with a scrambling mode format that suppresses synchronizing signals and randomly inverts video information, whereas the Decoder B apparatus may operate in accordance with an encoding format based upon frequency shifting.

Logic 18 includes well known circuitry for removing digital data transmitted during the television signal vertical blanking interval and for using the digital data to store information in memory, read information from memory, and to produce other information and signals. Among the signals generated is a so-called PEX signal representing the integrated vertical retrace pulse in the television signal and an AML pulse signal representing a market code match between the transmitted signal and the subscriber equipment. In accordance with the invention, the AML pulse becomes an identifier by occupying a different position in the vertical blanking interval, depending upon the particular encoding format being used. Thus for a format corresponding to decoder A, the AML pulse may be produced on line "X" of the vertical blanking interval and for a format corresponding to decoder B it may be produced on line "Y". The PEX and AML signals are supplied to a format mode switch 20 which has two outputs for selectively energizing decoder A and decoder B responsive to the AML identifier pulse. The decoder outputs are supplied to a modulator 22 which, in a well known manner, takes the baseband video information and remodulates it onto a suitable carrier, generally corresponding to television channel 3 or 4, for further processing.

In the above-mentioned encoding system with suppressed sync and inverted video, the data is transmitted on four consecutive horizontal lines in the vertical blanking interval. These are horizontal lines 10–13, with the market code information being included on line 13. The circuitry for receiving the blanking interval data, for identifying it and for interpreting it, is well known and needs no detailed explanation. Suffice it to say that at the beginning of the vertical blanking interval, the PEX signal is developed and is maintained for a predetermined number of horizontal lines unless sooner terminated by the occurrence of four consecutive horizontal lines of digital data. In the system mentioned, the PEX signal terminates at horizontal line 13. In accordance with the invention, the differentiation between the two encoding formats is provided by the position of the AML pulse. The mechanism for imparting the identification function to the AML pulse is a transfer of the data from horizontal lines 10–13 to horizontal lines 14–17, with the market code information being included on line 17 rather than on line 13. Thus, with existing equipment logic, the transfer of data from lines 10–13 to lines 14–17 will be followed because in the latter case, the PEX signal will not terminate until the four consecutive lines of data are received, namely at the end of horizontal line 17. With the technique, the position of the market code information (AML pulse) in the vertical interval, i.e. on HL 13 or on HL 17, is used as an identifier of the encoding format being used with the television signal.

Figure 2:
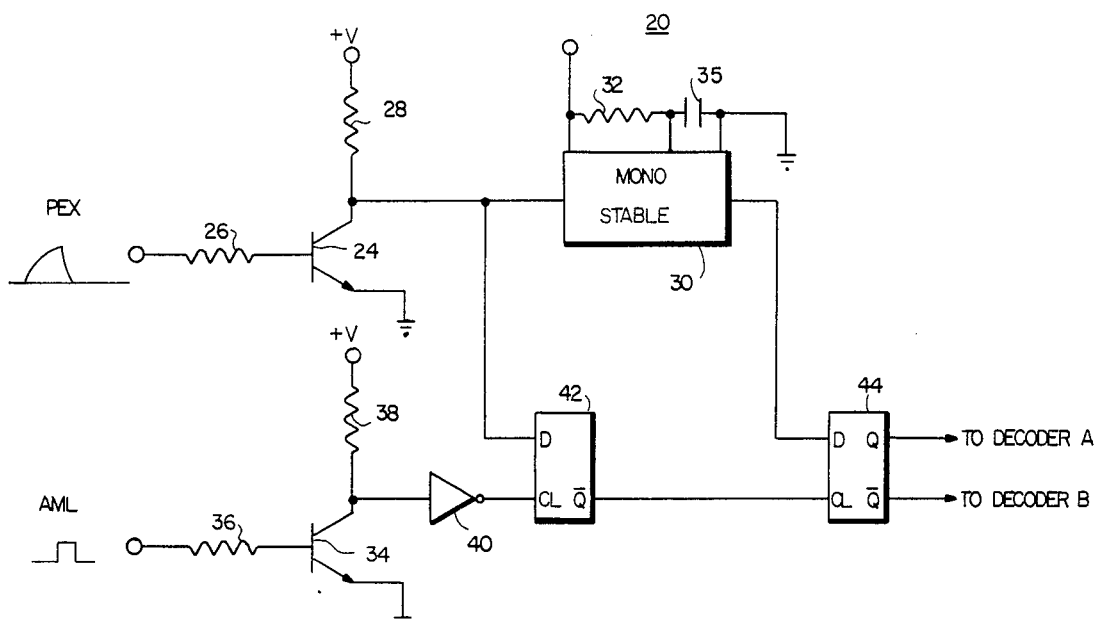
FIG. 2 is a partial schematic diagram of the format mode switch of FIG. 1.
Figure 3:
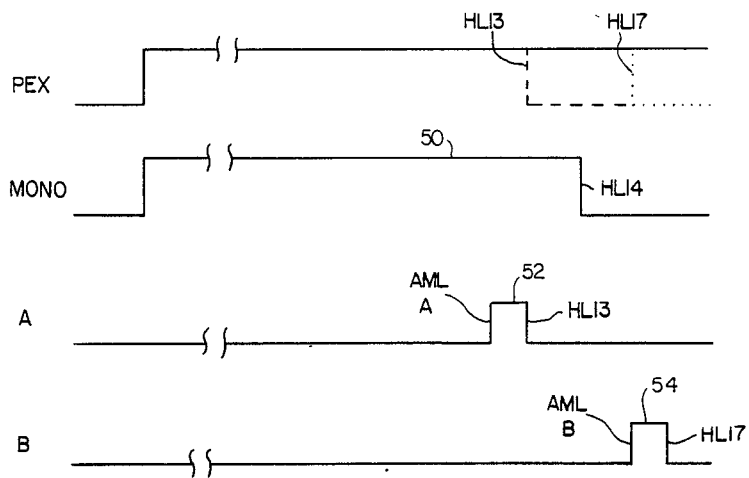
FIG. 3 is a series of waveforms illustrating an aspect of the invention.

Referring to FIGS. 2 and 3, format mode switch 20 includes an amplifier transistor 24 having its base supplied with the PEX signal through a resistor 26, its emitter connected to ground and its collector connected to a +V voltage source through a resistor 28. Its collector output is supplied to a monostable timing circuit 30 including a timing network having a resistor 32 and a capacitor 35 coupled thereacross and to the D input of a flipflop (FF) 42. The monostable circuit is initiated by the PEX signal at the base of transistor 24 and maintains an output for a time interval predetermined by timing network 32. This predetermined interval, as will be seen by reference to FIGURE 3, terminates between HL 13 and HL 17.

A transistor 34 has its base supplied with the AML pulse through a resistor 36. Its emitter is also grounded and its collector is connected to a +V through a resistor 38. The collector signal is passed through an inverter 40 for supplying a positive pulse to the clock input of FF 42. The Q output of FF 42 is connected to the clock input of an FF 44, the D input of which is supplied from the output of timing circuit 30. The function of FF 42 is to stretch the pulse corresponding to the AML pulse and to sharpen its edges. Thus FF 44 is supplied with a constant potential from timing circuit 30 at its D input and pulses from FF 42 at its clock input. FF 44 is a "D" type and its Q output follows its D input at the occurrence of a clock pulse. Conversely the opposite potential appears at its Q output. Consequently, FF 44 will determine the presence or absence of coincidence between the AML pulse and the timing circuit output.

Referring to the waveforms in FIG. 3, at the PEX pulse occurrence, the monostable is triggered to produce an output 50 which times out at HL 14. The PEX signal persists for a time extending past HL 17, to about HL 22, unless it is sooner terminated by the presence of data on four consecutive horizontal lines in the vertical interval. The solid line PEX represents the situation when no such data is detected, the dashed line portion indicates data on HL's 10–13 and the dotted line portion indicates data on HL's 14–17. Waveforms beneath the monostable waveform indicate the presence of an AML pulse 52 at HL 13 corresponding to encoding format A and waveform B indicates the presence of an AML pulse 54 at HL 17, corresponding to encoding format B. Since the monostable times out at HL 14, the "A" format AML pulse occurs when the monostable is operating and the B format AML pulse occurs when it is not. Consequently, FF 44 can differentiate between these occurrences and produce a corresponding output for activating either decoder A or decoder B. It is thus seen that with this system, the subscriber equipment can automatically follow the encoding format of the signal being sent. With the invention, a cable operator may change to a different encoding format, for example, on a deliberate and controlled basis without disruption of service to any subscriber and without incurring excessive costs. This may readily be accomplished, or example, by simply providing new subscribers with the dual decoder format equipment and gradually phasing out the old format equipment.

While apparatus for only two encoding formats is indicated, it should be apparent to those skilled in the art that a larger number of formats may be employed with suitable accommodations in terms of the identifying means (the AML pulse in the preferred embodiment), used to identify the particular transmission encoding format. It is recognized that numerous changes and modifications in the described embodiment of the invention will be apparent to those skilled in art without departing from the true spirit and scope thereof. The invention is to be limited only as defined in the claims.

I claim:

1. A television system comprising:
   means for supplying television signal transmissions selectively encoded in one of two different formats A and B;
   means supplying market code information on one of two horizontal lines in the vertical intervals of said television signal transmissions;
   means for receiving said television signal transmissions and said market code information;

means developing an identifier pulse from said market code information; and format mode means including a decoder A and a decoder B responsive to said identifier pulse for selectively decoding said television signal transmissions, the selected one of said two horizontal lines bearing said market code information in the vertical blanking interval of the television signal transmission determining whether the television signal transmission is encoded in format A or in format B.

2. The system of claim 1 further including means for determining the position of said identifier pulse in said vertical blanking interval comprising:

timing means for marking a time for distinguishing between the occurrence of an identifier pulse corresponding to format A and the occurrence of an identifier pulse corresponding to format B.

3. The system of claim 2 wherein said format mode means further includes a flipflop supplied with the output of said timing means and with said identifier pulse for controlling said decoders.

4. The system of claim 3 wherein said identifier pulse is either produced on horizontal line 13 or on horizontal line 17 and wherein said timing means times out at approximately horizontal line 14.

5. A cable television system comprising:

means for transmitting television signals encoded in a selected one of two different formats A and B, all of said television signals including market code information on one of two different horizontal lines in the vertical blanking intervals, with the horizontal line position of said market code information in said intervals determining said format A and said format B;

a decoder A and a decoder B for selectively decoding signals encoded in said formats A and B, respectively;

means for generating, from said market code information, an identifier pulse;

means for receiving said transmitted television signals and for determining, from said identifier pulse, the position of said market code information in the vertical blanking interval, said means including timing means initiated at the beginning of the vertical blanking interval and ending at a time in the vertical blanking interval occurring between said two different horizontal lines;

means for determining coincidence between operation of said timing means and occurrence of said identifier pulse; and a format mode switch for selectively energizing decoder A and decoder B as a function of said coincidence.

* * * * *